United States Patent [19]
Koyanagi et al.

[11] Patent Number: 5,808,977
[45] Date of Patent: Sep. 15, 1998

[54] TRACKING METHOD AND RECORDING MEANS THEREBY

[75] Inventors: Hajime Koyanagi, Koshigaya; Sumio Hosaka, Hinode-Machi; Ryo Imura, Tokorozawa, all of Japan

[73] Assignee: Hitachi, Ltd., Tokyo, Japan

[21] Appl. No.: 708,954

[22] Filed: Sep. 6, 1996

[30] Foreign Application Priority Data

Sep. 6, 1995 [JP] Japan .................................. 7-228897

[51] Int. Cl.⁶ ........................................................ G11B 7/00
[52] U.S. Cl. ............................ 369/43; 369/127; 369/128; 250/306
[58] Field of Search .................................. 369/126, 112, 369/124, 43, 127, 128, 44.26; 250/306, 307

[56] References Cited

U.S. PATENT DOCUMENTS 5,537,372  7/1996  Albrecht et al. ........................... 369/43
5,610,898  3/1997  Takimoto et al. ........................ 369/126

OTHER PUBLICATIONS

Physical Review Letters, "Atomic Force Microscope" by G. Binning, et al vol. 56, No. 9, pp. 930–933 (1986).
"Novel optical approach to atomic force microscopy" by Gerhard Meyer, et al vol. 53, No. 12, pp. 1045–1047 (1988).
"Atomic resolution with an atomic force microscope using piezoresistive detection" by M. Tortonese, et al, vol. 62, No. 8, pp. 834–836 (1993).
"The atomic force microscopoe used as a powerful tool for machining surfaces" by T.A. Jung, et al, vol.42, No.44, pp. 1446–1451 (1992).
"Thermomechanical writing with an atomic force microscope tip" by H.J. Mamin, et al, vol.61, No. 8, pp. 1003–1005 (1992).

*Primary Examiner*—Paul W. Huber
*Attorney, Agent, or Firm*—Antonelli, Terry, Stout & Kraus, LLP

[57] ABSTRACT

An object of the present invention is to provide a novel tracking method and device, suitable for use in a recording means applying the technology of a scanning probe microscope, for recording and/or reproducing high-density information of a size of several tens of nm or less at high speed and with high accuracy. The tracking method and device includes a recording medium having bumpy structures for tracking, which are formed on the surface thereof, a cantilever having a tip for writing in, reading out and erasing information, and means for detecting bending and torsion of the cantilever. Further, the tip and the recording medium are moved relative to each other in the direction in which a fixed end and a free end of the cantilever are coupled to each other, in a state in which the tip has been brought into proximity to or contact with the recording medium. In this state, the amount and direction of the torsion of the cantilever, or the amount of the bending thereof and the direction of the torsion thereof due to the bumpy structures are set as feedback signals so as to perform tracking.

14 Claims, 12 Drawing Sheets

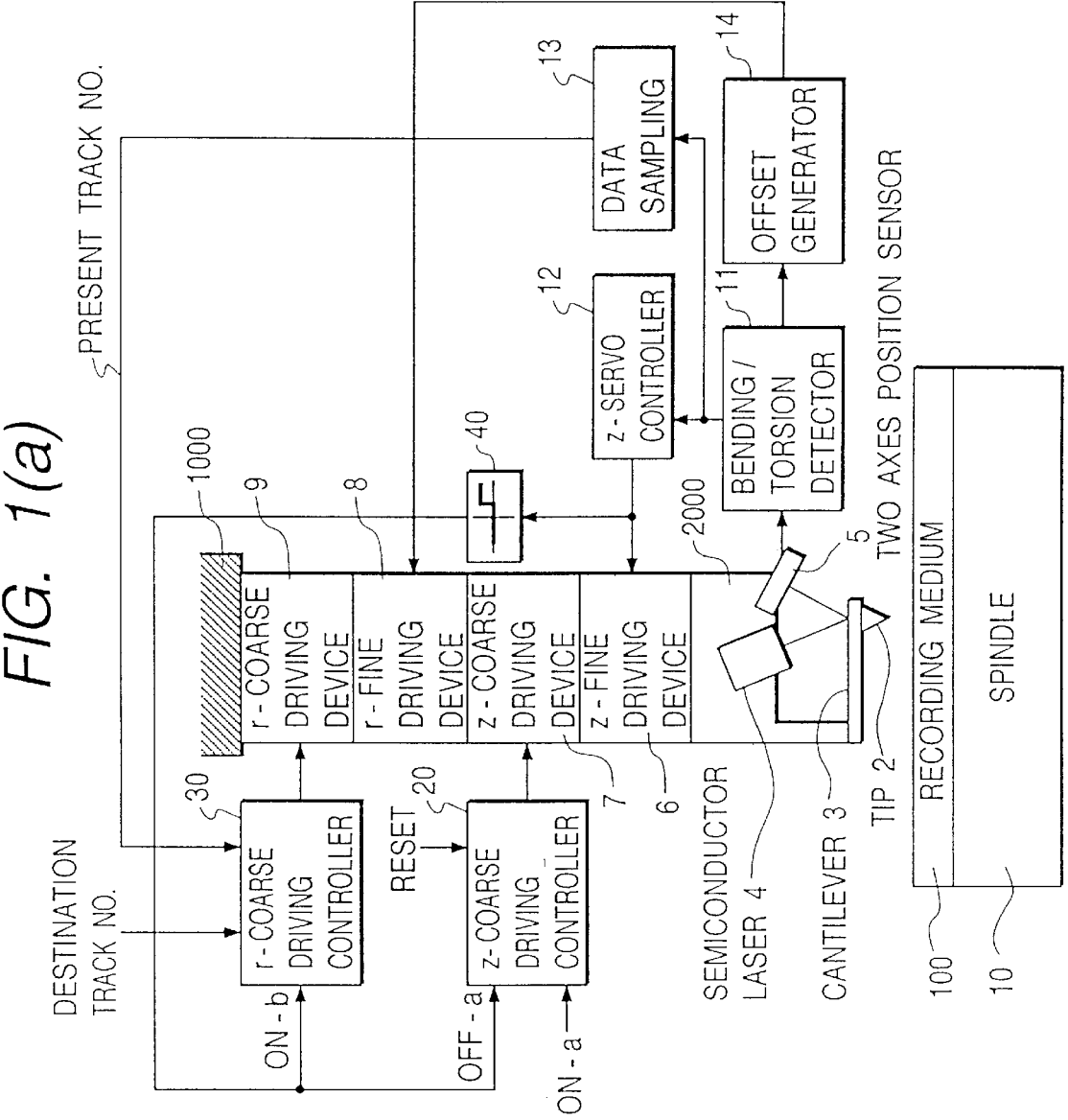

FIG. 1(b)
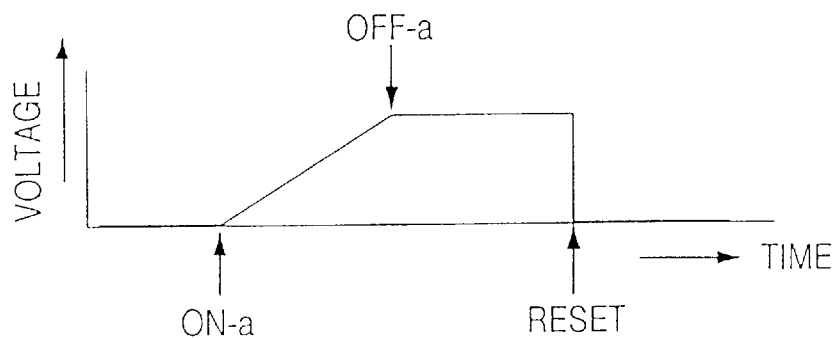
FIG. 2(a)1
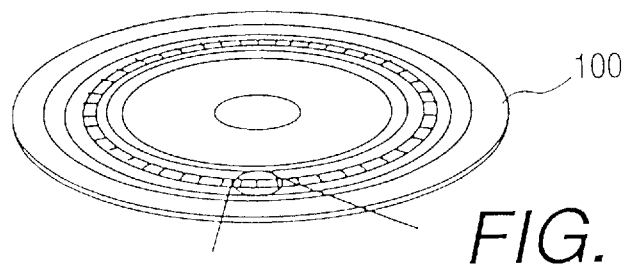
FIG. 2(a)2
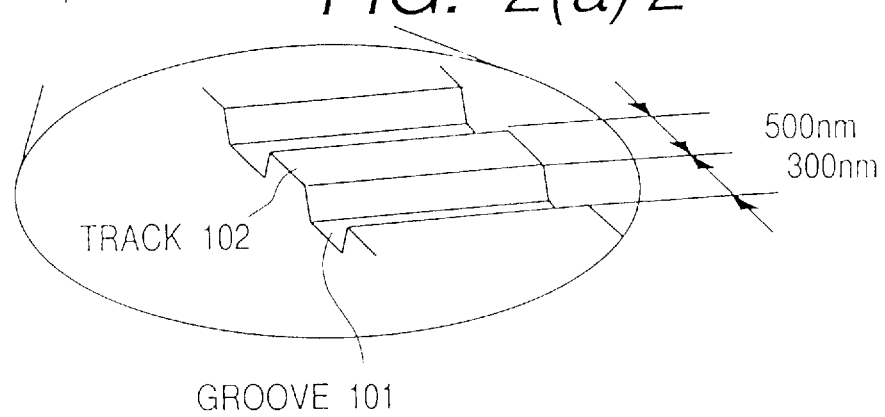

FIG. 2(b)1
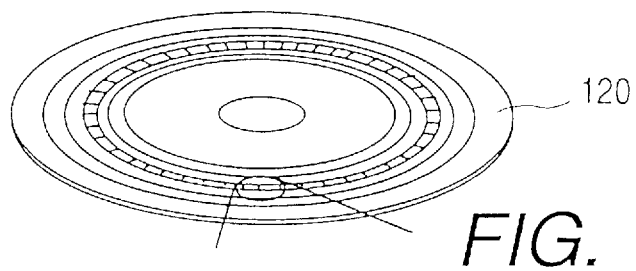
FIG. 2(b)2
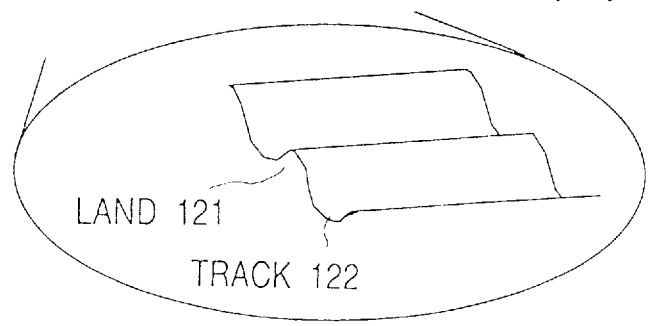

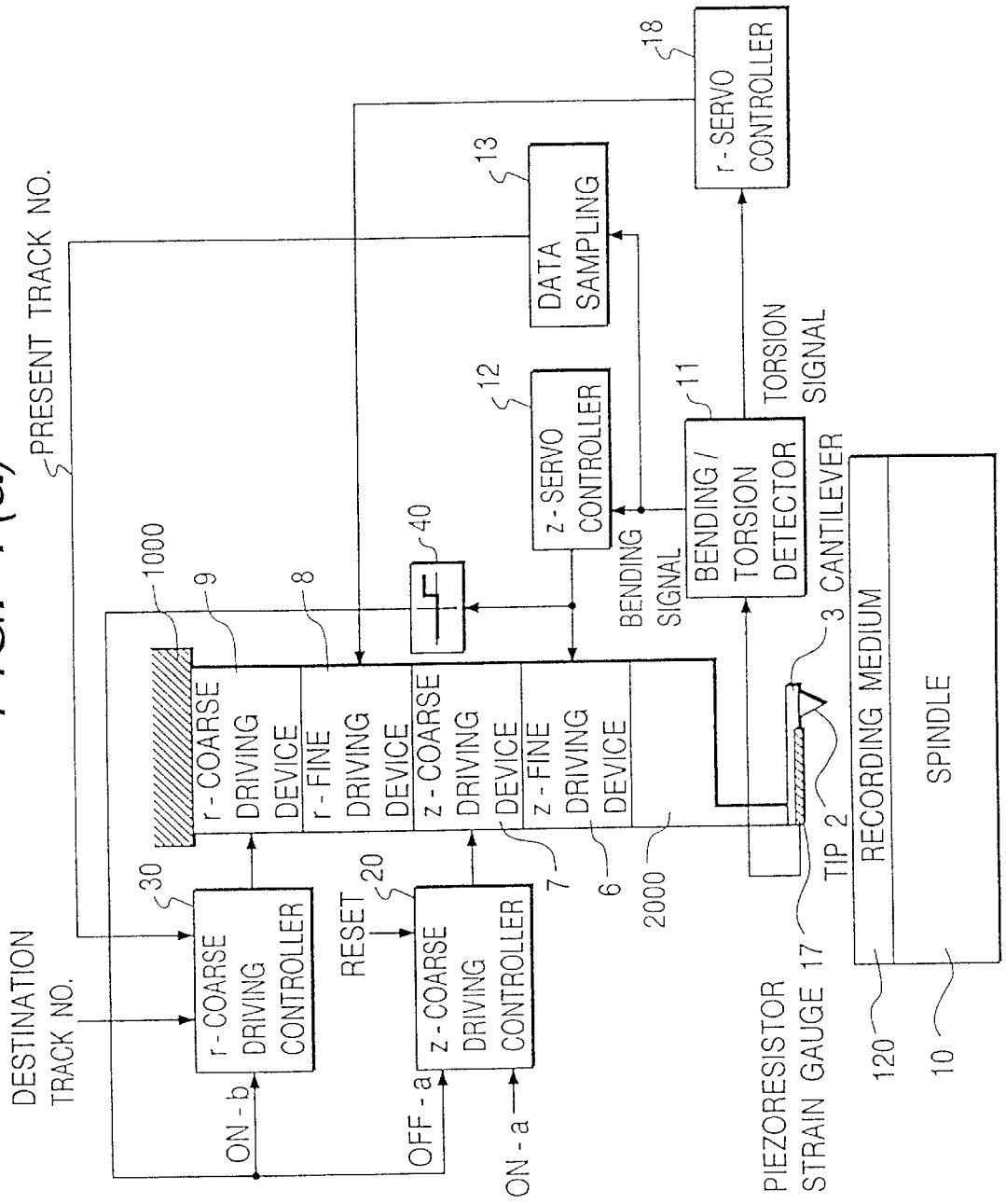

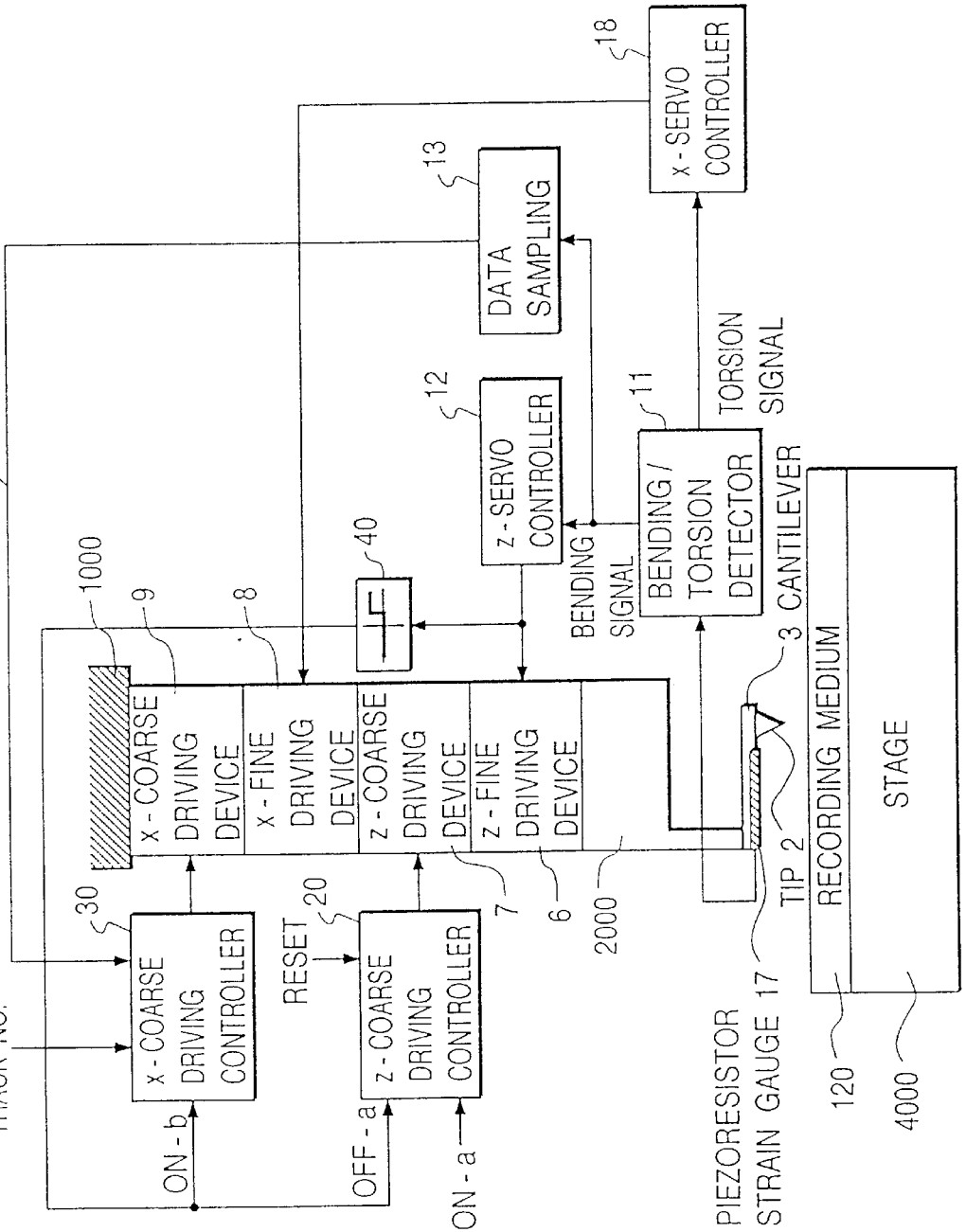

TRACKING METHOD AND RECORDING MEANS THEREBY

BACKGROUND OF THE INVENTION

The present invention relates to. a tracking method suitable for use in recording and/or reproduction of information and a recording means thereby, and particularly to a tracking method effective for recording and/or reproducing recording bits each having a size of several tens of nm or less at high speed. The tracking method can be used as a base technology for development of an ultra high density file memory.

With a leap forward for the silicon chip society, there has been recently a demand for the development of technology capable of storing larger quantity of information. In a field. of study on the file memory, there is now a demand for technology capable of bringing information each having a size of several tens of nm or less into high density. As a promising candidate, the technology of a scanning probe microscope typified by a scanning tunneling microscope is known. By paying attention to the principle which permits spatial resolution of a size up to an atomic size and micromachining technology up to the atomic size, the application of the principle to a recording means and its practical utilization have been vigorously forwarded.

SUMMARY OF THE INVENTION

In a recording means which applies the technology of a scanning probe microscope, information of nm size, for example, is recorded on the surface of a recording medium in high density by using a tip in accordance with an electrical, magnetic, thermal, optical or dynamic method or combination thereof, and some physical phenomena developed in a state in which the tip has been kept in proximity to the recording medium is detected, whereby the information recorded in high density is reproduced.

Recording and/or reproduction of information along each track having a width of several tens of nm or less are required to record and/or reproduce the high-density information of such a size of several tens of nm or less at high speed and with high accuracy.

An object of the present invention is to provide a novel tracking method and device suitable for use in a recording means for recording and/or reproducing high-density information having a size of several tens of nm or less at high speed and with high accuracy.

A construction of the present invention for achieving the above object is a recording means comprising a recording medium having bumpy structures for tracking, which are provided on the surface thereof, a cantilever with a tip for writing in, reading out or erasing information, means for detecting the amount and direction of bending and torsion of the cantilever, and means for moving the tip and the recording medium relative to each other in the direction in which a fixed end and a free end of the cantilever are coupled to each other, in a state in which the tip has been brought into proximity to or contact with the recording medium, thereby performing tracking with the amount and direction of the torsion of the cantilever due to the bumpy structures or the amount of the bending and the direction of the torsion as feedback signals.

In addition to the above construction, a recording means is provided which includes means for performing tracking along a rotatory coordinate-system or means for performing tracking along an orthogonal coordinate-system.

Further, a recording means is provided wherein the tracking bumpy structures of the surface of the recording medium are pits, mounds, grooves or a combination thereof.

Furthermore, a recording means is provided which includes means for producing one signal corresponding to the amount of displacement from the center of each track from a plurality of signals corresponding to the amount and direction of torsion of the cantilever or the amount of bending thereof and the direction of torsion thereof, which amount and direction are detected from a plurality of pits, mounds, grooves or a combination thereof, and setting the produced signal as a feedback signal to perform tracking.

The operation of the present invention will be described in detail. When the tip of the cantilever is kept in proximity to the surface of the recording medium, an interatomic force acts between them. Therefore, the amount and direction of the torsion of the cantilever or the amount of the bending thereof and the direction of the torsion thereof, which amount and direction are produced due to the tracking bumpy structures formed on the surface of the recording medium in advance, are detected while the tip and the recording medium are being moved relative to each other in the direction in which the fixed and free ends of the cantilever are connected to each other. Further, the tip is displaced along each track under feedback control.

When this means is used, it is possible to move the tip at high speed along each track having the size of several tens of nm or less. It is also feasible to write in, read out or erase recording information having a size of several tens of nm or less at high speed and with high accuracy.

BRIEF DESCRIPTION OF THE DRAWINGS

FIGS. 1(a) and 1(b) are respectively a view showing a block configuration of a first embodiment of the present invention and a view showing a waveform for describing the operation of a z-coarse driving controller of components included in the block configuration;

FIGS. 2(a) and 2(b) are respectively views illustrating examples of recording mediums to which the present invention can be applied;

FIGS. 7(a) and 7(b) are respectively views showing a block configuration of a third embodiment of the present invention and a configuration of a partial modification thereof;

FIG. 11 is a view illustrating a block configuration of a further embodiment of the present invention.

DETAILED DESCRIPTION OF THE PREFERRED EMBODIMENTS

Figure 3A:
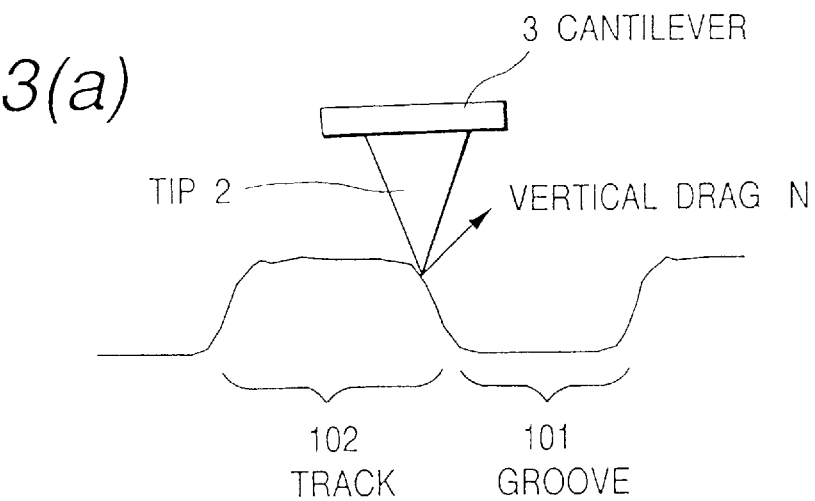
FIGS. 3 (a) and 3 (b) are respectively views showing drag which act on the leading ends of tips when they pass through track mark structures on recording mediums shown in FIG. 2 and torsion of cantilevers.

Preferred embodiments of the present invention will hereinafter be described specifically with reference to the accompanying drawings. FIG. 1 is a block configurational view showing an embodiment for realizing high-speed and high-accuracy tracking. In the present embodiment, a disc-like recording medium 100 made of silicon is used which has tracking grooves 101 defined in the surface of the recording medium 100 as shown in FIG. 2 (a). The grooves 101 are defined in the surface thereof in accordance with a semiconductor process in such a manner that about 500-nm tracks and 300-nm grooves are alternately disposed. Portions interposed between the grooves correspond to the tracks 102 respectively. Information to be recorded is written into each portion referred to above through a mound structure.

In the present embodiment, the writing of the information to be recorded is carried out as follows: A voltage pulse is applied between a probe or tip and a recording medium so as to evaporate atoms at the leading end of the tip by the application of an electric field, thereby forming a mound structure, whereby the recording information is written. However, any desired ones may be adopted if a method capable of forming the mound structure on the recording medium is used.

It is needless to say that the present invention is applicable to any other methods such as phase-change writing of information by resistive heating of a phase-change film, magnetization switching by resistive heating of a magnetic medium, electric polarization switching using a dielectric material, etc. as well as the formation of the bumpy structures as in the present embodiment. Reading methods corresponding to them may be adopted. It is however necessary to substantially match the diameter (corresponding to the length extending in the direction orthogonal to a track) of each recording bit with the width of the track upon tip reading so that the tip is able to read information whenever it is placed within the track.

Operations of the respective parts included in the block configurational view shown in FIG. 1 will first be described. An r-coarse driving device 9, an r-fine driving device 8, a z-coarse driving device 7 and a z-fine driving device 6 are disposed in a cascade form. One end of the r-coarse driving device 9 is fixed to a base 1000. One end of the z-fine driving device 6 supports or holds a holder 2000 for supporting a cantilever 3 to be described later.

A signal on-a is applied to a z-coarse driving controller 20 in response to the operation at the time that a person who uses a personal computer having a recording means according to the present invention, is intended to store or read data, e.g., record the data, so that a voltage whose rate of increase is constant is obtained in accordance with a constant-voltage integrating operation. The so-obtained voltage is applied to the z-coarse driving device 7 so as to allow a probe or tip 2 attached to one end of a cantilever 3 to approach a recording medium 100 by a distance corresponding to the voltage. Thus, when the tip 2 is pressed against the recording medium 100, vertical drag produced from the recording medium 100 acts on the tip 2. Bending and torsion occur in the cantilever 3 due to the vertical drag according to the shape of the surface of the recording medium 100. The deformation is detected by an optical lever detecting system composed of a semiconductor laser 4 and a two-axes position sensor 5. The detected signal is sent to a bending/torsion detector 11 where a bending signal and a torsion signal are produced from the resultant output of the two-axes position sensor 5. The bending signal is transmitted to a z-servo controller 12 and a data sampling 13, whereas the torsion signal is sent to an offset generator 14.

The z-servo controller 12 outputs a drive signal to the z-fine driving device 6 so that the bending of the cantilever 3 is kept constant, thereby performing feed-back control. When the level of a signal outputted to the z-fine driving device 6 exceeds a predetermined value set to a level detecting circuit 40, the level detecting circuit 40 outputs a signal as an off-a signal for stopping the integral operation of the z-coarse driving controller 20. Thus, the voltage applied to the z-coarse driving device 7 is maintained at the integral value. Simultaneously, the signal outputted from the level detecting circuit 40 is used as a signal on-b for starting the operation of an r-coarse driving controller 30. The r-coarse driving controller 30 supplied with the signal on-b applies a voltage corresponding to the difference between a destination track No. and the present track No. to the r-coarse driving device 9. The data sampling 13 gives the present track No. as a signal outputted therefrom by reading a track No. together when reads data as will be described later. As will be described later, the r-fine driving device 8 is supplied with the output of the offset generator 14 and performs fine follow-up control in response to the output of the offset generator 14 so that the tip 2 is not deviated from the track. After completion of the recording of data, the z-coarse driving controller 20 is supplied with a reset signal from an OS of the personal computer. Thus, the voltage, which has been held by the z-coarse driving controller 20, is reset so that the tip 2 is retracted from the surface of the medium by the z-coarse driving device 7. FIG. 1(b) shows the various control signals to be applied to the z-coarse driving controller 20 and the state of changes in voltage according to the control signals.

When the recording medium 100 on which the mound structure corresponding to the recording information has been formed, is rotated at high speed by a rotating drive device or spindle 10, the feedback control cannot respond to a high-frequency signal based on the mound structure, so that the bending of the cantilever 3 changes according to the mound structure. The data sampling circuit 13 extracts a signal corresponding to the recording information about the mound structure or mound recording information from the change in its bending so as to read data. Namely, since the cantilever 3 cannot be controlled so that the force applied to the tip 2 is kept constant, the cantilever 3 repeats deformation according to the mound structure. Thus, the data corresponding to the mound structure can be read.

Of course, the z-servo controller 12 outputs a drive signal to the z-fine driving device 6 so that the bending of the cantilever 3 is kept constant under the feedback control with respect to gentle deformation such as a swell and the like of the recording medium 100.

Further, the offset generator 14 generates an offset voltage in response to the torsion signal sent thereto and applies it to an r-fine piezoelectric element of the r-fine driving device 8. Since the amount and direction of a displacement from the center of each track are reflected through the torsion signal by placing the direction in which a fixing end and a free end of the cantilever 3 are coupled to each other, parallel to the direction of the track 102, the torsion signal can be used as a tracking signal. The offset generator 14 outputs an offset voltage for tracking to the r-fine driving device 8 to avoid the torsion of the cantilever 3, i.e., allow the tip 2 to follow the track 102.

A tracking method and device will now be described in detail. The tip 2 is displaced in the in-plane direction of the recording medium 100 along a rotatory coordinate-system by the r-coarse driving device 9 and the spindle 10. When the tip 2 deviates from the track 102 and enters into a side portion of each groove 101, vertical drag N acts on the tip 2 as shown in FIG. 3(a). The cantilever 3 is twisted by a lateral component of the vertical drag N, which is parallel to the surface of the recording medium 100, a so-called lateral force. Other friction also actually acts on the tip 2 and torsion is also developed due to the friction. This influence can be avoided by selecting a combination of materials for a recording medium and a tip in which the amount of the friction is as small as negligible with respect to the lateral force produced due to the bumpy structures for tracking, or by applying lubricant to the surface of the recording medium.

Figure 4A:
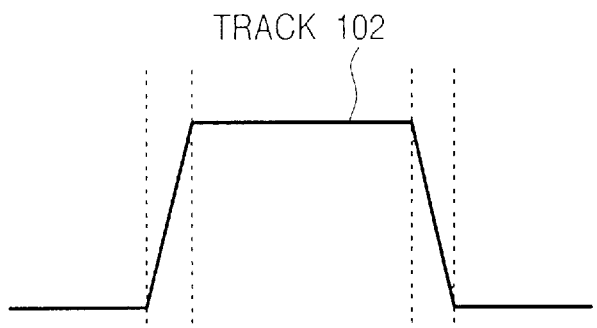
FIGS. 4(a), 4(b) are respectively views illustrating a sectional shape of a track, a torsion signal and an offset voltage, all of which are employed in the first embodiment.
Figure 4B:
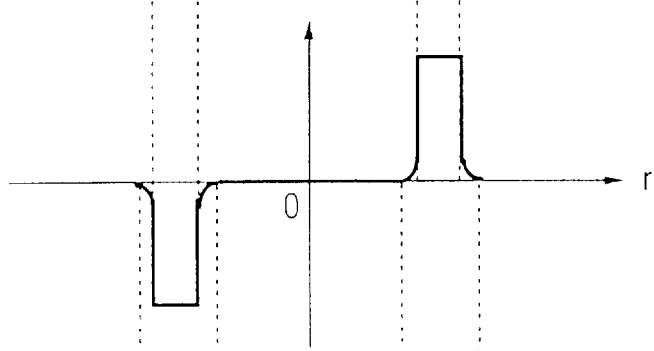
Figure 4C:
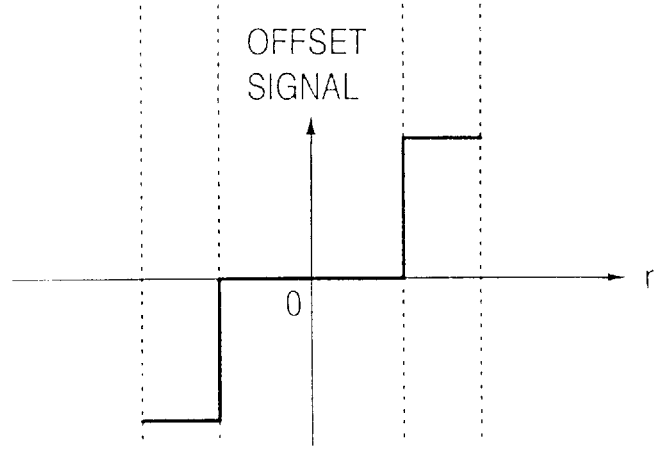

FIG. 4 typically illustrates the relationship between signals produced where the tip 2 is placed on the track 102 and where the tip 2 deviates from the track 102. FIG. 4(a) shows the shape of a cross section of the track 102. FIG. 4(b) illustrates the relationship between the position of the radius direction r of the tip 2 and a torsion signal. This torsion signal is outputted from the bending/torsion detector 11 to the offset generator 14. Although torsion due to the mound recording information is also actually produced, a decision can be made based on a bending signal as to whether the torsion signal results from either the mound recording information or a groove. Namely, if the result of decision is found to be the mound recording information, then a bending signal corresponding to the mound recording information is simultaneously generated. Therefore, when the bending signal is enough large, it is understood that the torsion due to the mound recording information has been produced. In the case of the groove alone, the offset generator 14 outputs an offset voltage necessary to return the tip 2 to within the track to the r-fine driving device 8 as shown in FIG. 4(c). It is thus possible to write in, read out or erase the recording information at high speed while tracking control is being effected on the 500-nm-wide track 102.

Figure 5:
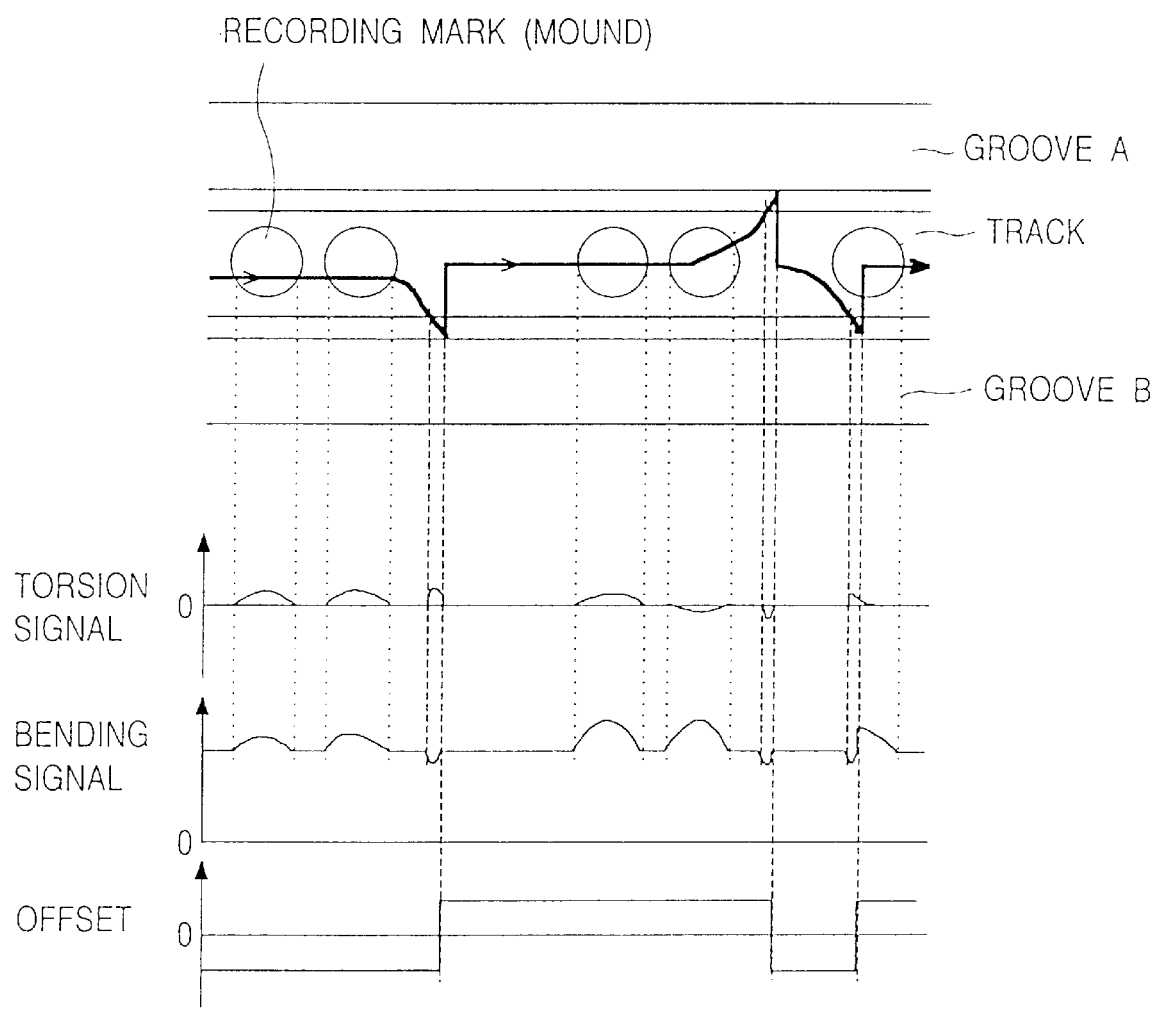
FIG. 5 is a view for describing the function of reading recorded information and generating an offset signal for tracking, which is employed in the first embodiment.

FIG. 5 is a view for explaining the function of reading recorded information and generating an offset signal for tracking. A track is formed on the surface of a recording medium 100 while being interposed between grooves A and B when the recording medium 100 is seen from the upper surface thereof as illustrated on the upper side of FIG. 5. Further, mound recording bits corresponding to data are created on the formed track. Although the track and the tip are now moved relative to each other, the tip occasionally falls off from the track while passing on the mound recording bits as indicated by a thick line with arrows in FIG. 7 as seen on the upper side in the drawing. Further, a bending signal and a torsion signal are obtained in this process. As is understood from attention given to the time when the bending signal and the torsion signal are generated and their polarities, data corresponding to a mound recording bit is obtained when the bending signal changes in the positive direction and the level thereof is greater than a predetermined level. When the bending signal changes in the negative direction and the torsion signal exists, the tip starts to fall along a slant surface extending from the track to the groove.

Therefore, the offset signal for tracking may be produced according to the polarity of the torsion signal. Further, when the tip continues to drop onto the slant surface extending to the groove or falls into the groove due to some reasons, a control signal is outputted from the z-servo controller 12. Therefore, when this signal continues for a long time interval, it is necessary to generate an offset signal as well.

In the present embodiment, the portion interposed between the grooves is the track. However, if control directed toward a sharp inclination existing between the track and groove is done even when the recording information is written into the bottom face of the groove with the groove defined as the track, it is needless to say that tracking control similar to above can be carried out.

In the present embodiment as well, the tracking control is done in a contact mode often used in the field of a tip-to-recording medium contact type microscope, i.e., an atomic force microscope. It is needless to say that even in the case of a non-contact mode or tapping mode, tracking control similar to above can be of course done by setting torsion of a cantilever due to a lateral component of van der Waals forces produced from bumpy structures, to a tracking signal.

Figure 3B:
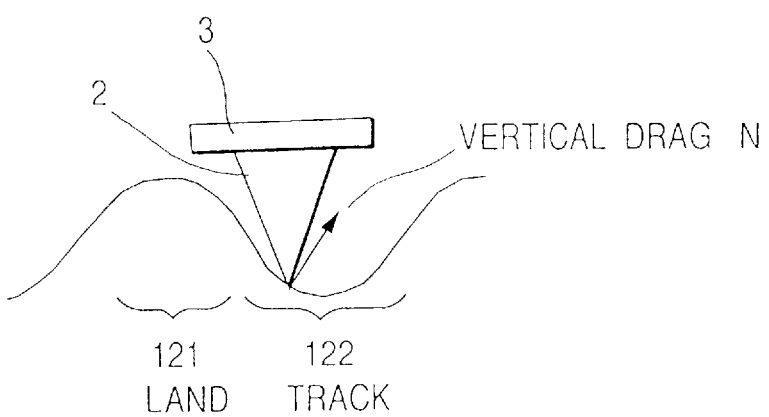

In another embodiment, a recording medium 120 having lands 121 and tracks 122 shown in FIG. 2(b) is used. Since the land and the track are formed as a repetition of a smooth and continuous waveform as is apparent in contrast with FIG. 2(a), a higher-density recording device can be constructed. When such a construction is adopted, a portion between the adjacent lands 121, which corresponds to a stabler position, is used as the track 122 as shown in FIG. 3(b). In the present embodiment, since vertical drag N is developed when the tip 2 is intended to deviate from the corresponding track, tracking can be done using this phenomenon.

Figure 9A:
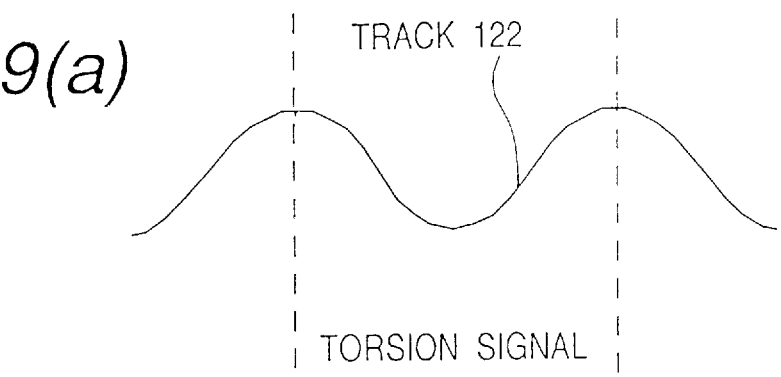
FIG. 9 a–c is a view for describing the function of reading recorded information and generating an offset signal for tracking, which is employed in the second embodiment.
Figure 9B:
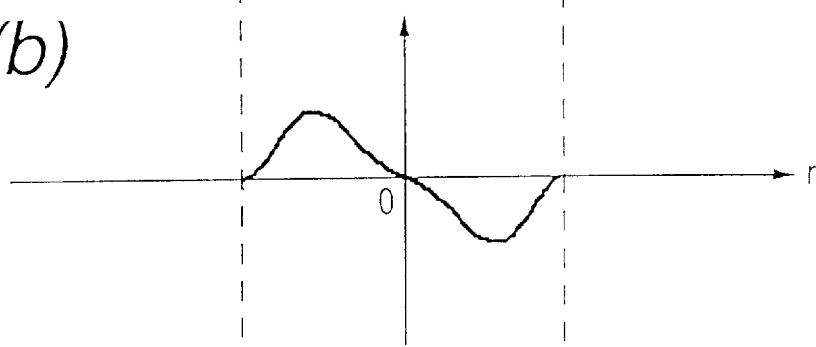
Figure 9C:
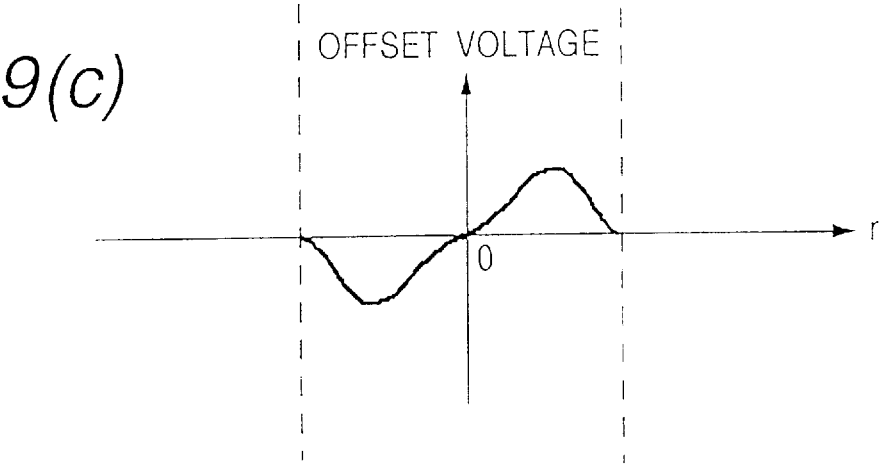

FIG. 9 a–c typically shows the relationship between signals at the time that the tip 2 exists on the track 122 and deviates from the track 122 in a manner similar to FIG. 4 employed in the previous embodiment. FIG. 9(a) illustrates the shape of a cross section of each track 122. FIG. 9(b) shows the relationship between the position of the radius direction r of the tip 2 and a torsion signal from the corresponding track 122. The torsion signal is servo-controlled so as to reach zero to thereby effect tracking control on each track 122.

Figure 10:
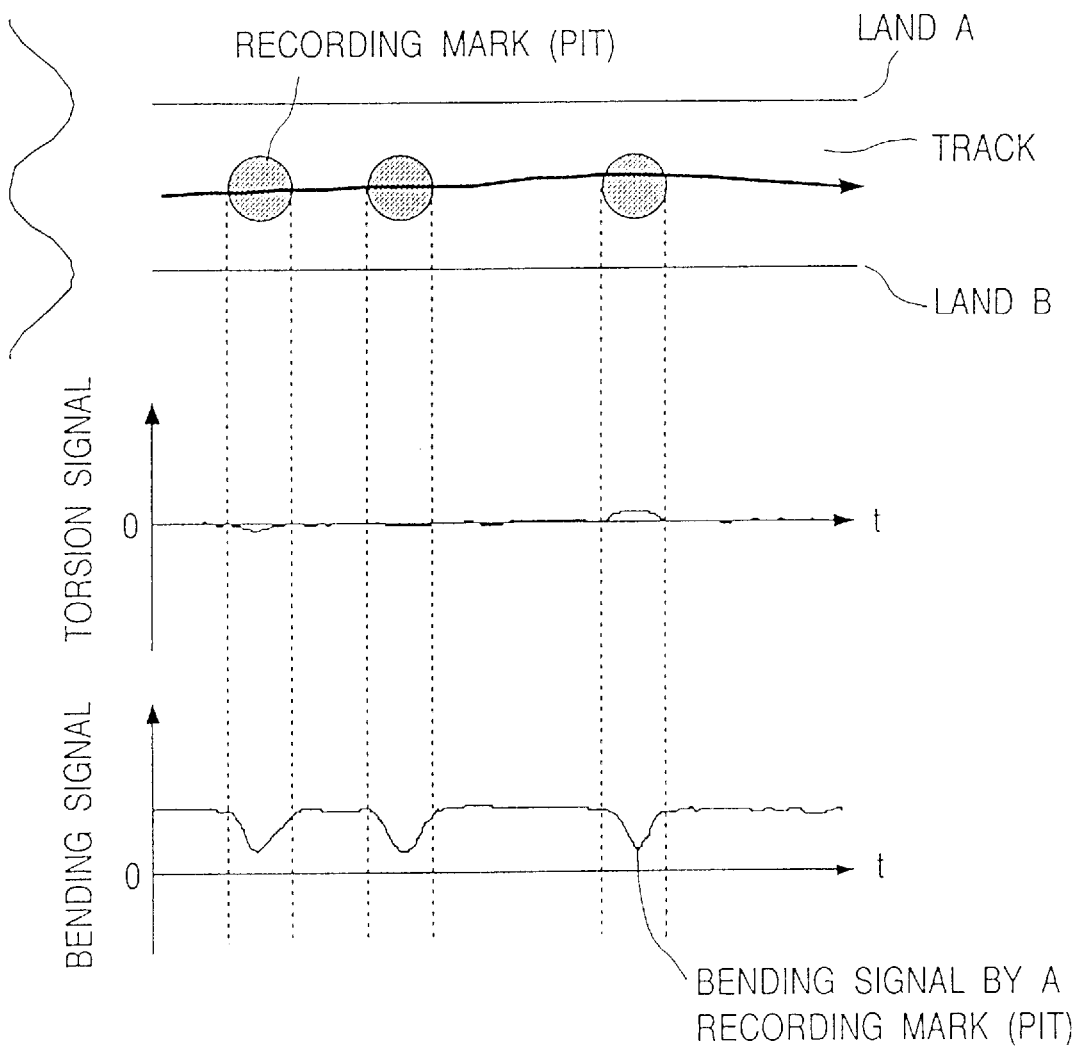
FIG. 10 is a view for explaining the function of reading recorded information, which is employed in the second embodiment.

FIG. 10 is a view for explaining the function of reading recorded information. As is illustrated in a cross-section configuration on the upper left side of FIG. 10, lands for tracking are formed on the surface of the recording medium 120. Tracks are constructed such that pit recording bits corresponding to recording data are respectively formed between the lands. Although each track and the tip are now moved relative to each other, the tip passes over each track and pit recording bits as indicated by a thick line with arrows in the drawing. Since the tip is disposed at the stablest position in the present embodiment, the tip is not greatly deviated from the track. However, a torsion signal is produced according to the deviation from the position of the center of each track 122 as shown in FIG. 9. Further, a change in bending signal is obtained according to each pit recording bit. The bending signal is used as data. Since the torsion signal produced in association with each pit is so high in frequency as compared with the torsion signal shown in FIG. 9(b), an r-servo controller 18 cannot follow it, so the signal is eventually neglected. Thus, an unnecessary tracking operation is not performed.

Figure 7B:
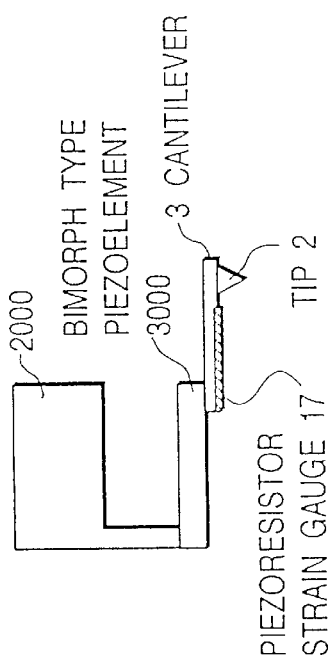

FIG. 7 shows an embodiment in which a unit for detecting a signal corresponding to each recording bit has been changed from the optical level to a piezoresistor strain gauge 17. In the present embodiment, the piezoresistor strain gauge 17 is applied onto a cantilever 3 and the output thereof is introduced into a bending/torsion detector 11. A torsion signal of outputs produced from the bending/torsion detector 11 is introduced into an r-servo controller 18. The r-servo controller 18 outputs a signal for normally controlling the torsion signal to 0 (center of track) to an r-fine driving device 8. A bending signal of the outputs produced from the bending/torsion detector 11 is introduced into each of a z-servo controller 12 and a data sampling 13. The z-servo controller 12 generates a signal for controlling the bending signal to a predetermined value in such a manner that a predetermined repulsive force acts between a tip 2 and a recording medium 120. Further, the z-servo controller 12 applies the generated signal to a z-fine driving device 6. The data sampling 13 extracts a bending signal corresponding to a pit recording bit lying on the high-frequency side as seen from a frequency band of a signal processed by the z-servo controller 12.

Portions other than the above-described portions in the present embodiment are essentially identical to those shown in FIG. 1 and their description will be omitted. Even in the case where recording information is defined as a mound recording bit, the aforementioned portions can be changed correspondingly so as to cope with the case, but their description will be omitted.

Figure 6:
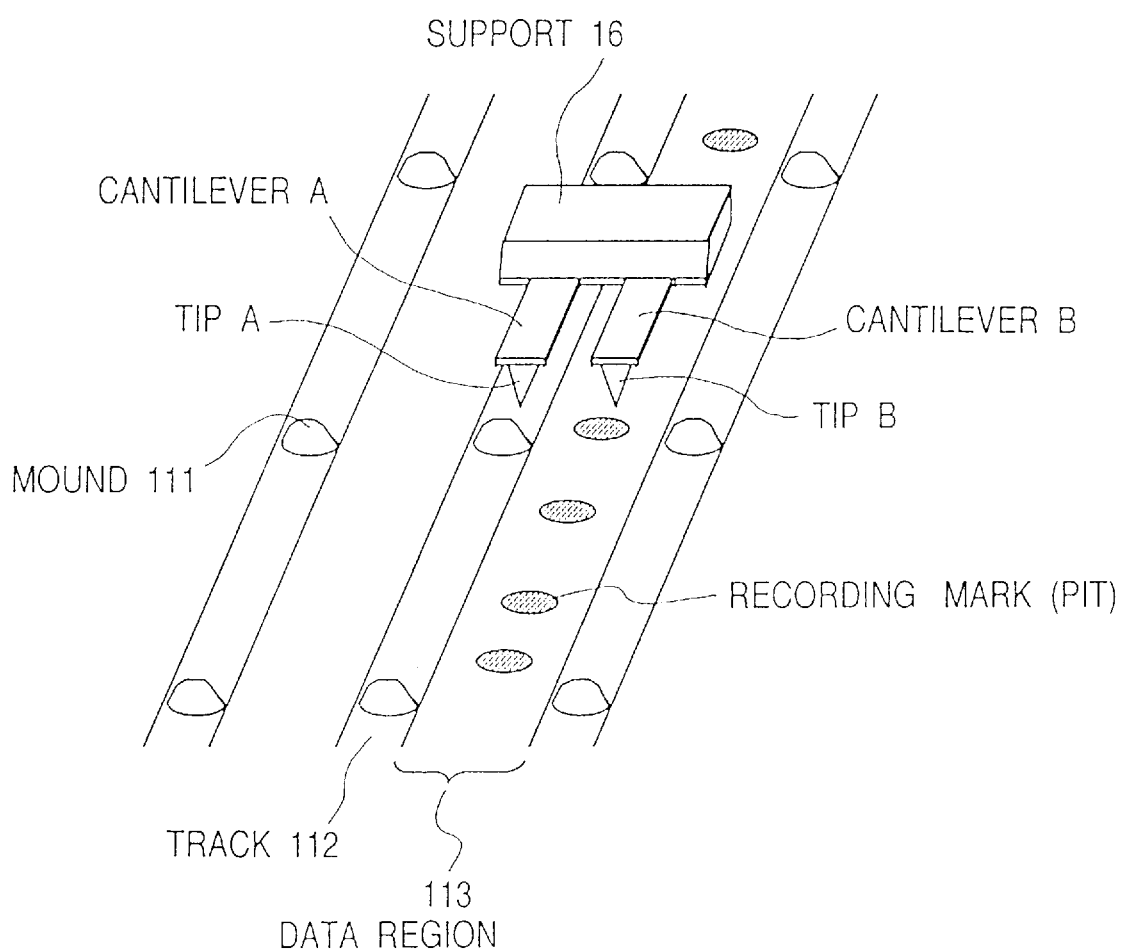
FIG. 6 is a view for explaining an embodiment illustrated as a multi-probe configuration.
Figure 8:
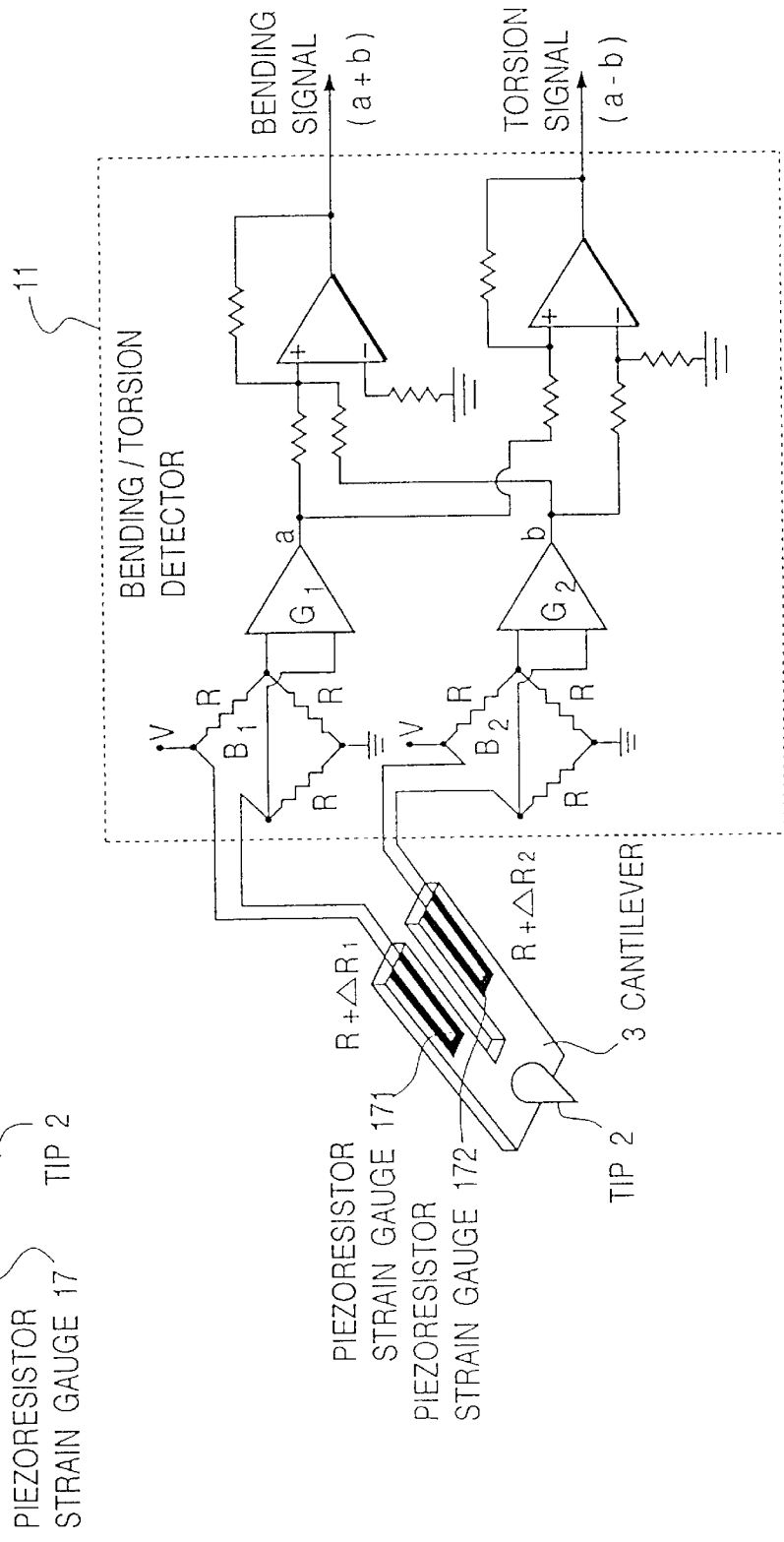
FIG. 8 is a view showing, in detail, one example of the configuration of a bending/torsion detector employed in the second embodiment of the present invention.

A specific example of the bending/torsion detector 11 will now be described with reference to FIG. 8. A cantilever 3 is divided into two parts except for a tip 2 provided at the leading end of the cantilever 3. Piezoresistor strain gauges 171 and 172 are applied onto their corresponding portions. Resistors R +$\Delta R_1$ and R +$\Delta R_2$ of these piezoresistor strain gauges 171 and 172 are inserted into one sides of Wheatstone bridges $B_1$ and $B_2$. Since the tip 2 follows the recording medium 120 according to the shape of the surface thereof and the resistance values of these resistors vary according to the deformation of the cantilever 3, outputs a and b of differential amplifiers $G_1$ and $G_2$ for the Wheatstone bridges $B_1$ and $B_2$ vary correspondingly. Result of a+b with regard to outputs a and b produced from the differential amplifiers $G_1$ and $G_2$ can be computed by an arithmetic circuit so as to obtain a bending signal and a–b thereof can be computed by the arithmetic circuit so as to obtain a torsion signal. An embodiment showing a multiprobe using two tips will be described with reference to FIG. 6. In the present embodiment, a recording medium 110 having mounds 111 corresponding to the discontinuous tracking marks, which mounds are provided on each track 112, is used. The diameter of each mound 111 is about 50 nm. Such tracks 112 are formed at intervals of about 800 um. In the present embodiment, each recording information is a pit structure in which it is written into a data region between the adjacent tracks. This writing is done by applying a voltage pulse between each tip and the recording medium and thereby evaporating medium surface atoms by an electric field.

In the present embodiment, a tip A and a cantilever A are used specifically for tracking, and a tip B and a cantilever B are used specifically for recording/reproduction. The tip A and the cantilever A detect each mound 111 in a manner similar to the second embodiment and effects tracking on each track 112 using bending and torsion of the cantilever A. The tip B and the cantilever B are fixed to a support table 16 together with the tip A and the cantilever A. The distance between the tips A and B is set to about 400 um. Thus, the tip B and the cantilever B can record information into a data region 113 independently of the tip A and the cantilever A and reproduce the information. In order that the tips A and B are normally kept in contact with the surface of the recording medium during the rotation of the recording medium, it is necessary to sufficiently bend the cantilevers A and B. The tracking and recording/reproduction may be done independently of each other by using such two pairs of tips in plural form.

In the present embodiment, the diameter of each recording bit may preferably be about three times the diameter of each mound 111 on the track 112 to allow the tip B to read the information whenever the tip B falls within the data region 113. Namely, this is because in order to enable recording and reading when the tip A for tracking is located in the limit positions of both sides of each mound 111, the tip B needs to be able to record and read the information at their positions.

An embodiment will be described in which multivalues are recorded by using bumpy structures in combination as recording information or using them and other information recording method as the recording information. By simply using the bumpy structures as the recording information and setting a tracking method, three-value recording can be easily realized. Writing-in, reading-out or erasing of recording information can be performed separately from tracking control in accordance with the following normal method used for optical recording or the like. Mounds corresponding to tracking marks are formed over one round of each track by predetermined numbers. When a recording medium is rotated in this state, each tracking mark appears at predetermined periodic intervals. Thus, if the writing of the recording information into a data region between the adjacent tracking marks, reading out or erasing of the recording information therefrom is performed, then a track signal can be separated from a data signal in terms of time. In this case, the writing of the recording information into the data region, the reading out or erasing of the recording information therefrom can be done separately from the tracking control. The bumpy structures are formed by applying a voltage pulse between a tip and the recording medium so as to evaporate medium surface atoms by an electric field or by evaporating tip atoms by an electric field so as to supply the atoms to the surface of a medium. Three-value recording can be done by causing the bumpy structures to correspond to the recording information.

If electrical and magnetic forces produced from the surface of a recording medium as well as the bumpy structures are used in combination as recording information and they are defined as multidata, it is then possible to record multivalues exceeding four values.

The aforementioned embodiments show the case where the torsion and bending of the cantilever, which function as the tracking signals, are produced by the forces from the bumpy structures of the surface of the recording medium. However, tracking control similar to above can be of course done even in the case where the above forces are of the electric and magnetic forces produced from the surface of the recording medium or even in the case of combination thereof. In this case, an electric polarization medium using a ferroelectric substance and a conductive tip or a combination of a magnetic medium and a magnetic tip is used. A polarization pattern for tracking is formed on the medium in advance. By using torsion of a cantilever due to a lateral component of an electrical or magnetic force produced from the polarization pattern as a tracking signal, tracking control similar to those employed in the above—described embodiments can be performed.

Now consider the case in which the recording information is used as the pit structure. In the aforementioned embodiments, the recording information has been processed by the evaporation using the electric field. However, mechanical pressure may be used as an alternative to this process. In the embodiment shown in FIG. 7, for example, the cantilever 3 with the piezoresistor strain gauge 17 applied thereon is mounted to a holder 2000 through a bimorph type piezoelectric element 3000 as shown in FIG. 7 (*b*). When it is desired to record information about a pit structure, a predetermined voltage is applied to the bimorph type piezoelectric element 3000 to thereby control the tip 2 so as to be firmly pressed against the surface of the recording medium. When the information is read out, the bimorph type piezoelectric element 3000 is used as a simple structure without being supplied with the voltage and may be handled as one for connecting the cantilever 3 and the holder 2000 to one another.

Further, the movement of the tip relative to recording medium is not necessarily limited to the rotation as in the first and second embodiments. It is needless to say that the invention of the present application can be applied even to the case in which the movement is considered as linear movement of the tip by an X-Y coordinate-system. FIG. 11 shows a block configuration at the time that a stage 4000 driven in a Y direction by a piezoelement has been adopted and realized in place of the spindle 10 employed in the embodiment shown in FIG. 7. In this case, the r-fine driving device 8, the r-coarse driving device 9 and the r-coarse driving controller 30 may be respectively replaced by an x-fine driving device 8, an x-coarse driving device 9 and an x-coarse driving controller 30. Further, the r-servo controller 18 may be replaced by an x-servo controller 18. The operation under this structure may use the driving in the Y direction in place of the rotation and the control in the r direction may be defined as control in the X direction. Therefore, their specific description will be omitted.

According to the present invention, as has been described above, since a tip can be moved at high speed along each track having a width of several tens of nm or less, recording information having a size of several tens of nm or less can be written, read out and erased at high speed and with high accuracy.

We claim:

1. A method of tracking a recording device along a recording medium having a plurality of continuous tracks at a first reference height and on which information is recorded, isolating areas being provided between respective said tracks and at a second reference height to provide separation between respective said tracks, with said first reference height and said second reference height being mutually different from one another, and means to hold a tip which moves relative to said recording medium and produces signals corresponding to the recorded information and information being generated by movement of said tip from a track to an isolating area, said method comprising the steps of: detecting a signal about an amount and direction of bending or torsion which acts on said holding means in response to the recorded information, and a signal about the amount and direction of bending and torsion which act on said holding means in response to movement of said tip from said track to said isolating area; and feeding back a feedback signal to said holding means to counter movement from said track to said isolating area so as to perform tracking.

2. A method of tracking a recording device according to claim 1, wherein the recorded information is detected from electric and magnetic forces produced from the surface of said recording medium, and the feedback signal to said holding means to counter movement from said track to said isolating area corresponds to the amount and direction of torsion.

3. A recording means comprising:

a recording medium having a plurality of continuous tracks at a first reference height and on which information is recorded, isolating areas being provided between respective said tracks and at a second reference height to provide separation between respective said tracks, with said first reference height and said second reference height being mutually different from one another;

means for holding a tip which moves relative to said recording medium and produces signals corresponding to the recorded information and information being generated by movement of said tip from a track to an isolating area; and means for feeding back a signal about an amount and direction of bending and torsion which acts on said holding means to counter movement from said track to said isolating area so as to perform tracking.

4. A recording means according to claim 3, wherein said holding means comprises a cantilever having a free end to which a tip for writing in, reading out or erasing information is attached.

5. A recording means according to claim 4, wherein the movement of said tip relative to said recording medium is the direction in which the fixed end and free end of said cantilever are coupled to each other.

6. A recording means according to claim 4, wherein the movement of said tip relative to said recording medium is a rotatory coordinate-system.

7. A recording means according to claim 4, wherein the movement of said tip relative to said recording medium is an orthogonal coordinate-system.

8. A recording means according to claim 3, wherein said tracks are formed as one of a land and groove and said isolating areas are formed as an opposite one of the groove and land on the surface of the recording medium.

9. A recording means according to claim 3, wherein the recorded information is detected from electric and magnetic forces produced from the surface of said recording medium, and the feedback signal to said holding means to counter movement from said track to said isolating area corresponds to the amount and direction of torsion.

10. A recording means according to claim 9, wherein said holding means comprising a cantilever having a free end to which a tip for writing in, reading out or erasing information is attached.

11. A recording means according to claim 9, wherein the movement of said tip relative to said recording medium is in a direction in which the fixed end and free end of said cantilever are coupled to each other.

12. A recording means according to claim 9, wherein the movement of said tip relative to said recording medium is according to a rotatory coordinate-system.

13. A recording means according to claim 9, wherein the movement of said tip relative to said recording medium is according to an orthogonal coordinate-system.

14. A recording means according to claim 9, wherein said tracks are formed as one of a land and groove and said isolating areas are formed as an opposite one of the groove and land on the surface of the recording medium.

\* \* \* \* \*